US012579683B2

(12) United States Patent
Wang et al.

(10) Patent No.: US 12,579,683 B2
(45) Date of Patent: Mar. 17, 2026

(54) IMAGE VIEW ADJUSTMENT

(71) Applicant: 1FINITY Inc., Kawasaki (JP)

(72) Inventors: Nannan Wang, Allen, TX (US); Xi Wang, Murphy, TX (US); Ladan S. Pickering, Plano, TX (US); Paparao Palacharla, Richardson, TX (US); Mauricio Martinez, Plano, TX (US); Darryl Ellis Whitlock, Carrollton, TX (US)

(73) Assignee: 1FINITY Inc., Kawasaki (JP)

( * ) Notice: Subject to any disclaimer, the term of this patent is extended or adjusted under 35 U.S.C. 154(b) by 833 days.

(21) Appl. No.: 17/710,872

(22) Filed: Mar. 31, 2022

(65) Prior Publication Data

US 2023/0316565 A1     Oct. 5, 2023

(51) Int. Cl.
*G06T 7/73* (2017.01)
*G06V 10/74* (2022.01)

(52) U.S. Cl.
CPC ............. *G06T 7/74* (2017.01); *G06V 10/761* (2022.01); *G06T 2207/20084* (2013.01); *G06V 2201/07* (2022.01)

(58) Field of Classification Search
CPC ............ G06T 7/74; G06T 2207/20084; G06V 10/761; G06V 2201/07
See application file for complete search history.

(56) References Cited

U.S. PATENT DOCUMENTS

| | | | | |
|---|---|---|---|---|
| 2022/0301192 | A1* | 9/2022 | Boardman | .............. G06T 7/579 |
| 2023/0090281 | A1* | 3/2023 | Kurtz | ................. G02B 13/0095 |
| | | | | 359/725 |

FOREIGN PATENT DOCUMENTS

CN     110809119 A  * 2/2020

* cited by examiner

*Primary Examiner* — Andrew W Bee
*Assistant Examiner* — Winta Gebreslassie
(74) *Attorney, Agent, or Firm* — Maschoff Brennan

(57) ABSTRACT

A method may include obtaining a first image of a first view. The first illustrated by the first image may be defined by one or more viewing parameters. The method may also include acquiring, from a machine learning system, a location of an object within the first image, calculating a relative position of the object within the first image using the location of the object within the first image, and determining whether the relative position of the object satisfies a condition. In response to the relative position of the object not satisfying the condition, at least one of the viewing parameters may be adjusted based on the relative position of the object and the condition. The method may further include obtaining a second image of a second view. The second view illustrated by the second image may be defined by the adjusted at least one of the viewing parameters.

18 Claims, 7 Drawing Sheets

IMAGE VIEW ADJUSTMENT

The embodiments discussed in the present disclosure are related to image view adjustment.

BACKGROUND

Machine learning systems may be used to detect objects within an image. For example, linear regression, logistic regression, decision tree, and support vector machine algorithms as well as many types of neural networks may be used to detect and label objects within an image. For example, an object may be labeled as correspond to a particular object category.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a method may include obtaining a first image of a first view. In some embodiments, the first view illustrated by the first image may be defined by one or more viewing parameters. The method may also include acquiring a location of an object within the first image from a machine learning system. The method may further include calculating a relative position of the object within the first image using the location of the object within the first image. The method may further include determining whether the relative position of the object satisfies a condition. In some embodiments, in response to the relative position of the object not satisfying the condition, at least one of the viewing parameters may be adjusted based on the relative position of the object and the condition. In some embodiments, a second image of a second view may be obtained, and the second view illustrated by the second image may be defined by the adjusted at least one of the viewing parameters.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Image recognition using machine learning algorithms is used in many different technologies and system. Image recognition, generally, may include multiple different types of applications. For example, image recognition may classify an image or provide a probability that an image belongs to a particular classification. Alternately or additionally, image recognition may detect objects in an image and provide a boundary box around each of the objects within the image.

In some circumstances, systems that use image recognition may be open looped systems. As such, an output of image recognition may only include the information contained in an image of a scene provided for recognition. As a result, if an image does not include all of the information sought to be obtained, systems may not obtain all the information that could be obtained if the image included a different view of a scene.

Some embodiments of the current disclosure may include systems and/or methods of image view adjustments. For example, a first image may include a first view. The first view illustrated by the first image may be defined by viewing parameters. It may be determined that first view does not include particular types of information about an object in the first image. As a result, the viewing parameters may be adjusted so that a second image may be obtained using the adjusted viewing parameters to obtain a second image that may include the particular types of information about the object. In some embodiments, it may be determined that a view does not include particular types of information about an object based on a relative position of the object within the image.

Figure 1:
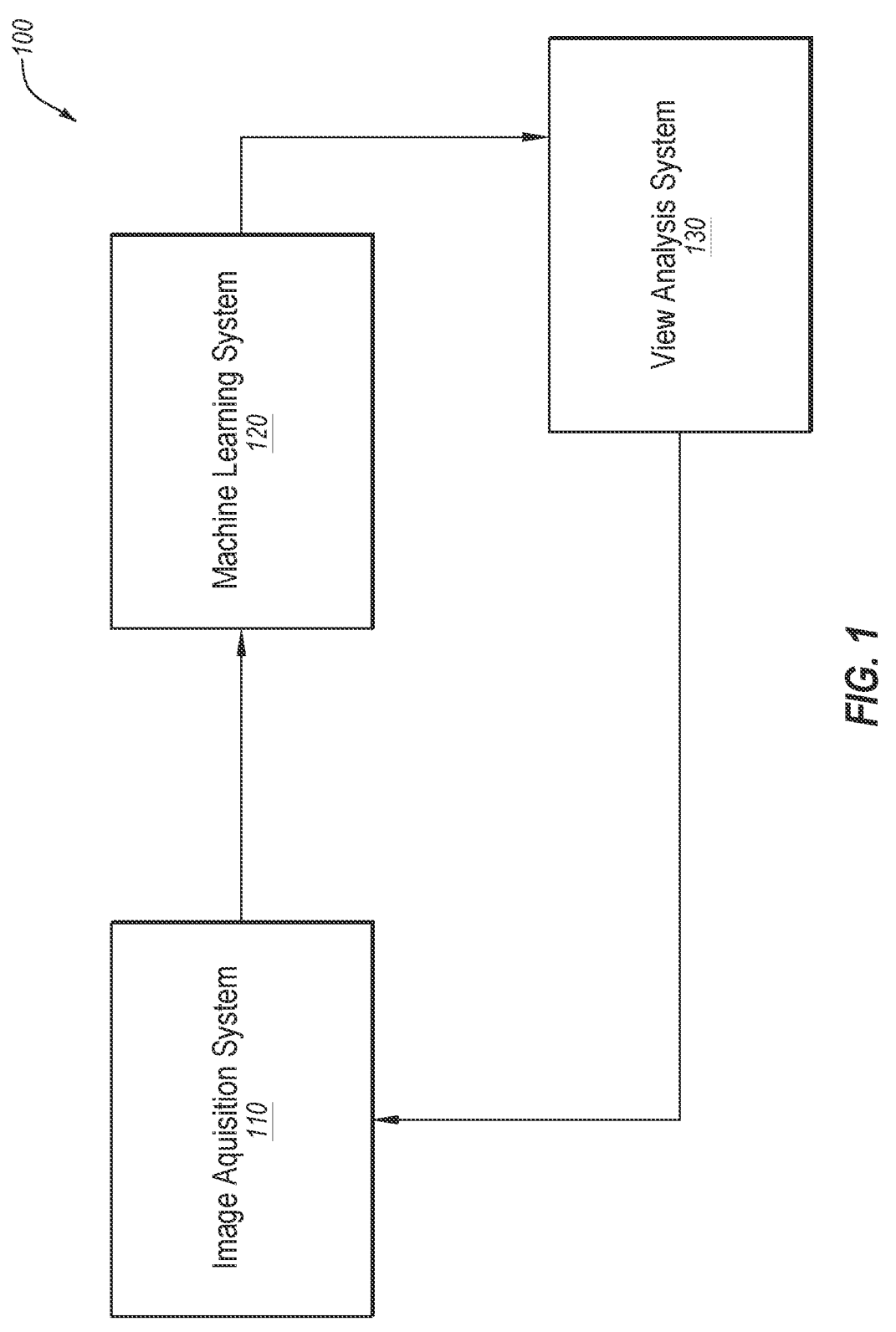
FIG. 1 illustrates an example environment for image view adjustment.

FIG. 1 illustrates an example environment 100 for adjusting a view of an image. The environment 100 may be arranged in accordance with at least one embodiment described in the present disclosure. The environment 100 may include an image acquisition system 110, a machine learning system 120, and a view analysis system 130.

In some embodiments, the image acquisition system 110 may be configured to obtain a first image of a first view of a scene. The first view illustrated by the first image may be defined by one or more viewing parameters used to capture the first image of the scene. For example, the viewing parameters may include heading, field of view, and pitch, among other viewing parameters.

In these and other embodiments, a heading may include a direction for a perspective of an image. For example, the direction may be from the north, south, west, or east, among others. The field of view may include a zoom. Thus, a narrow field of view may capture a smaller view and a larger field of view may capture a larger view. The pitch may include an angle of inclination. For example, in a first location with the same heading and field of view, an image with a first pitch may include a view of the sky and an image with a second pitch may include a view of the ground.

In some embodiments, a change in one or more of the viewing parameters used to obtain a second image may result in a change in a view of the scene illustrated by the second image. In contrast, no change in the viewing parameters may result in a second image being acquired of the first view of the scene.

In some embodiments, the image acquisition system 110 may obtain the first image from a sensor, an application, or an application programming interface (API), among other sources. In some embodiments, the sensor may be an imaging sensor, such as a charge-coupled device sensor or active-pixel sensor, a radar sensor, a light detection and ranging (LIDAR) sensor, among other types of sensors that may produce some sort of image in which objects may be detected. In some embodiments, the environment 100 may be included in a device that includes the sensor, such as a vehicle, drone, ship, or other device. Alternately or additionally, the environment 100 may be separate from the device that includes the sensor. In these and other embodiments, the environment 100 may obtain the image from the sensor. For example, the image acquisition system 110 may request the image from the sensor.

In some embodiments, the image acquisition system 110 may provide the viewing parameters to the sensor. Based on the viewing parameters, the sensor may capture the image and provide the captured image to the image acquisition system 110.

In some embodiments, the application or the API may be configured to access a data storage of images that cover a scene. In these and other embodiments, the image acquisition system 110 may obtain the first image from the application and/or the API based on a location and the viewing parameters provided to the application and/or the API. For example, for a given location and a first set of viewing parameters, the application and/or the API may provide a first image of a first view and for the given location and a second set of viewing parameters the application and/or the API may provide a second image of a second view. The image acquisition system 110 may provide the first image to the machine learning system 120.

In some embodiments, the machine learning system 120 may obtain the first image from the image acquisition system 110. The machine learning system 120 may be configured to process the first image using one or more machine learning algorithms.

In some embodiments, the machine learning system 120 may be configured to process the first image to obtain data about the first image. The data may include objects identified within the first image. In these and other embodiments, the machine learning system 120 may identify the objects and determining a bounding box that surrounds the object. In these and other embodiments, the machine learning system 120 may also classify the objects within the first image. The machine learning system 120 may apply any known technique or combination of techniques to identify the objects, determine a bounding box, and classify the objects in the first image. For example, in some embodiments, a combination of machine learning algorithms may be used. For example, linear regression, logistic regression, decision tree, or a support vector machine algorithms may be applied. Alternately or additionally, deep-neural network (DNN) based object detection algorithms may be used. For example, convolutional neural network (CNN) algorithms may be used, including region based (R-CNN), Fast R-CNN, Faster R-CNN, and you only look once (YOLO) algorithms, among other types of algorithms.

The machine learning system 120 may provide the data about the first image, including one or more of the identified objects, the bounding boxes, and the classified objects, to the view analysis system 130.

Figure 2A:
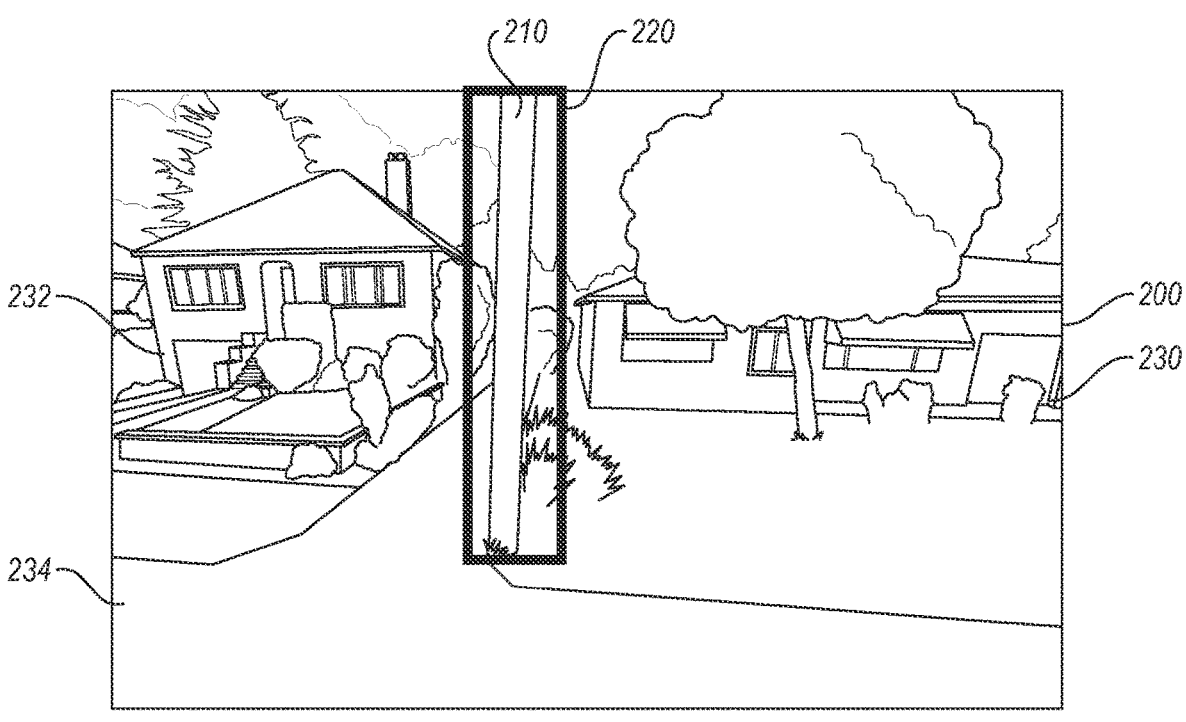
FIGS. 2A and 2B illustrate different views of a scene.

An example of an image that illustrates a first view of a scene with an identified object and a bounding box is illustrated by FIG. 2A. For example, FIG. 2A illustrates a first view 200 that includes an electric pole 210 and a first bounding box 220 that surrounds the electric pole 210 and includes dimensions that approximate the largest dimensions of the electric pole 210 in the x and y direction within the first view 200. The first view 200 further includes a first house 230, a second house 232, and a street 234. The data provided by the machine learning system 120 may identify the first bounding box 220 as bounding an electric pole.

Returning to a discussion of FIG. 1, in some embodiments, the view analysis system 130 may be configured to obtain the data about the first image from the machine learning system 120. The view analysis system 130 may be configured to apply one or more rules to the data to determine if the data includes information associated with the rules. In response to the data including the information associated with the rules, the view analysis system 130 may provide the information to another system for use by the other system. In response to the data not including the information associated with the rules, the view analysis system 130 may determine adjustments to the viewing parameters used to obtain the first image. The view analysis system 130 may provide the adjustments to the viewing parameters to the image acquisition system 110. In these and other embodiments, the image acquisition system 110 may use the adjustments to the viewing parameters to obtain a second image with a second view. The machine learning system 120 may obtain data from the second image to which the view analysis system 130 may apply one or more rules to determine the information associated with the rules.

Figure 2B:
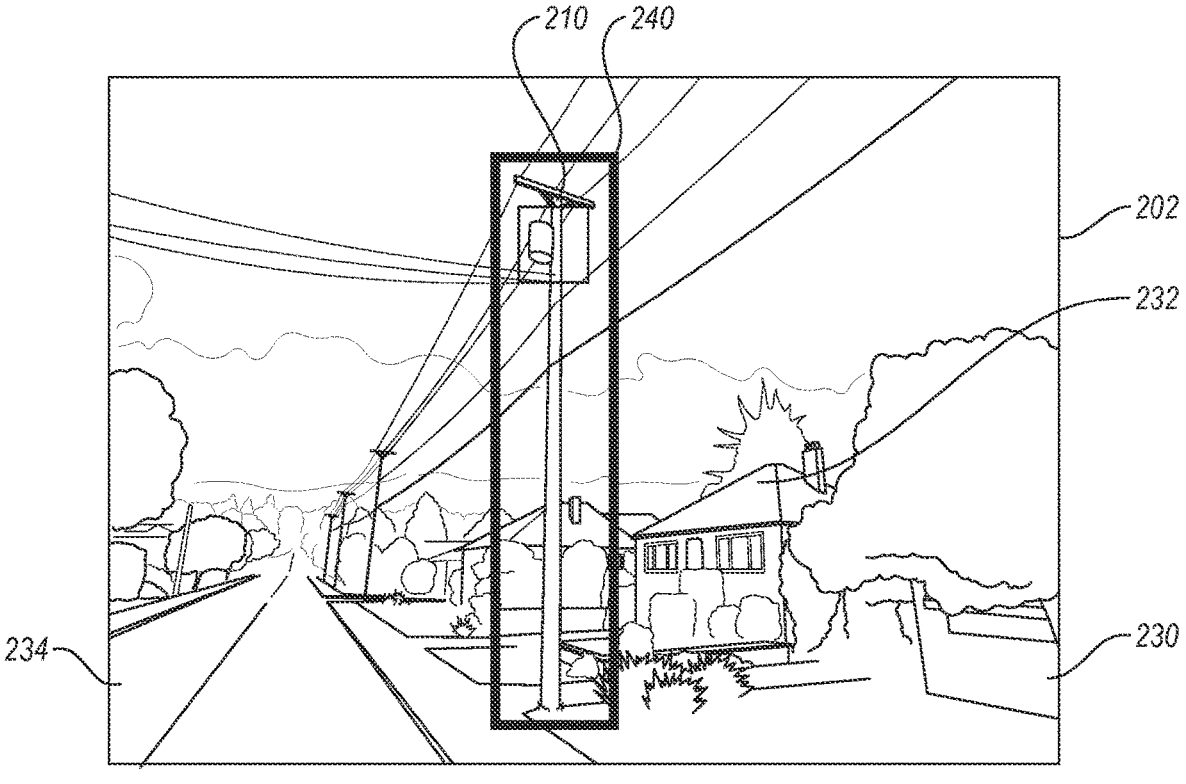

An example of changing a view of a scene is illustrated by FIGS. 2A and 2B. As discussed, FIG. 2A illustrates the first view 200 that includes the electric pole 210, the first house 230, the second house 232, and the street 234. FIG. 2B illustrates a second view 202 of the same scene that includes the electric pole 210, the first house 230, the second house 232, and the street 234. However, note that the heading, the filed of view, and the pitch used for the first view 200 in a first image is different than the heading, the field of view, and the pitch used for the second view 202 in a second image. As a result, a top of the electric pole 210 is including in the second view 202. Note that the scene, e.g., the geographic location, illustrated in the first view 200 and the second view 202 is the same. For example, a camera that may capture the first image and the second image may be located in the same location. However, the difference between the first view 200 in the first image and the second view 202 in the second image is not from a change in location of the camera, but rather occurs by a change in the viewing parameters used by the camera to capture the first image and the second image.

Returning to a discussion of FIG. 1, in some embodiments, the rules applied by the view analysis system 130 may be based on the objects being identified in the images and/or the information being obtained from the images. For example, the information may relate to obtaining an ownership of a type of object. In these and other embodiments, a first rule applied by the view analysis system 130 may include determining if one or more of multiple classified objects from data of an image matches the type of object. In response to none of the multiple classified objects matching the type of object, no further analysis may be performed. In response to one or more of the multiple classified objects matching the type of object, additional analysis may be performed.

In some embodiments, information may relate to multiple different types of objects or multiple of a single type of object. For example, the information may relate to a spatial relationship between two or more objects of the same type or of different types. In these examples, the information being obtained from the image may relate to determining a spatial relationship between people. Alternately or additionally, the information being obtained from the image may relate to a determining whether a person is sitting in a driver seat of a car. In these and other embodiments, a first rule applied by the view analysis system 130 may include determining if multiple classified objects from data of an image matches the type of objects. In response to the multiple classified objects not matching the type of objects, no further analysis may be performed. In response to the multiple classified objects matching the type of objects, additional analysis may be performed.

Note that the machine learning algorithms used by the machine learning system 120 may be selected based on the rules, the information being obtained from the images, and/or the objects to be identified. For example, a specific machine learning algorithm trained for identifying a particular object may be used when information about the particular object is sought to be obtained from the images.

In some embodiments, after determining an object of interest, such as one object or multiple objects, is within an image, the additional analysis may be performed to obtain information regarding the positional relationship of the object or objects. In these and other embodiments, the positional relationship of an object may be determined with respect to the position of the object within a view. For example, the position of the object within the view may be determined. Alternately or additionally, the positional relationship of a first object may be determined with respect to a position of one or more second objects. The determined positional relationships of objects may be applied to the rules. The rules may indicate based on the positional relationship that additional adjustments to one or more of the viewing parameters may be made. In these and other embodiments, the positional relationship of the object may be used to determine the adjustment to the viewing parameters. For example, a positional relationship that indicates that an object is located to the left and up from a center of a first view may result in viewing parameter being adjusted to bring the object to the center of a second view.

Figure 3:
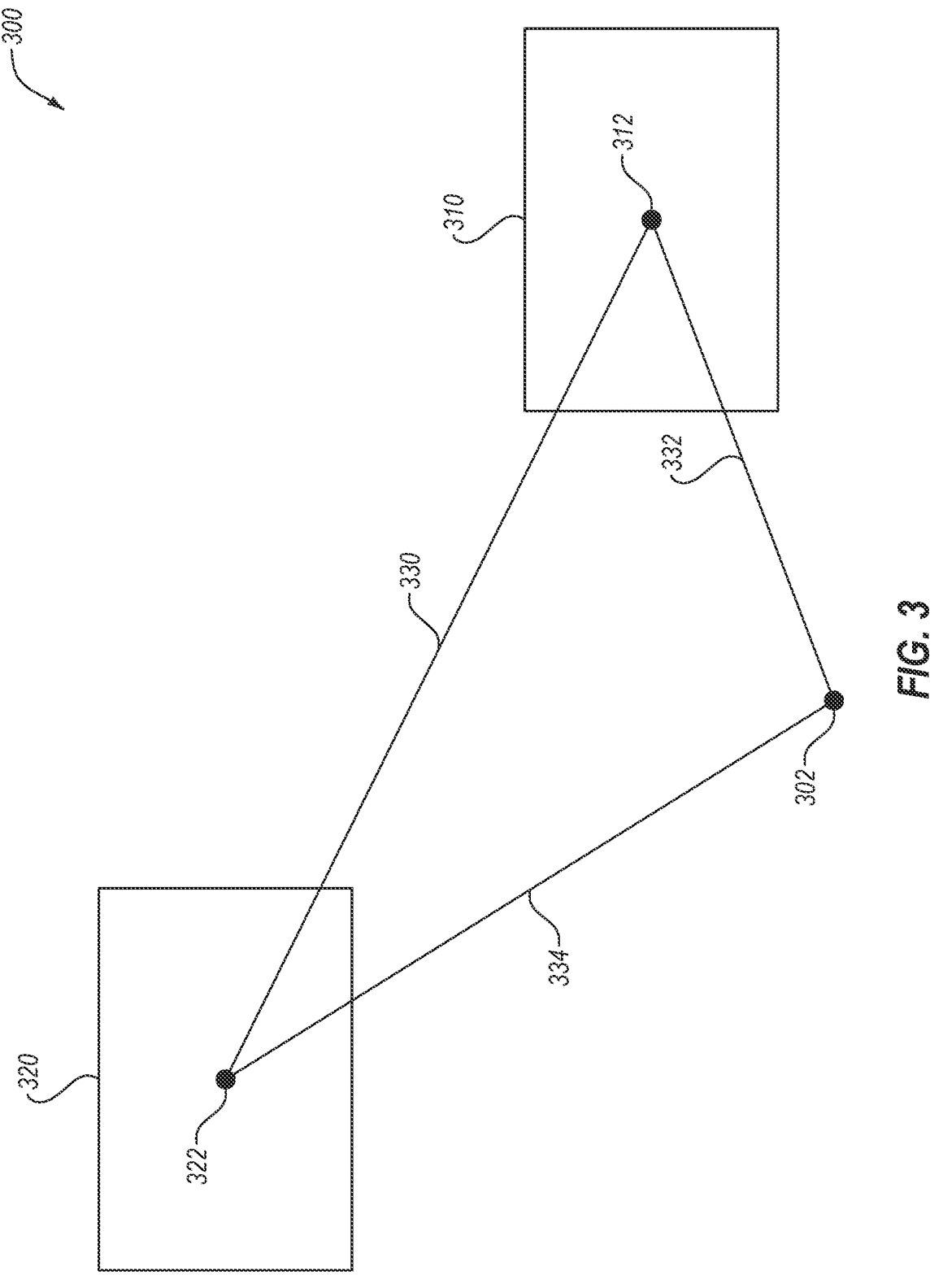
FIG. 3 illustrates an example image used in image view adjustment.

FIG. 3 illustrates an example regarding how positional relationships between objects in an image 300 may be determined. The image 300 may include an image center position 302, a first bounding box 310 with a first center position 312, and a second bounding box 320 with a second center position 322.

The first bounding box 310 may surround a first object in the image 300. The second bounding box 320 may surround a second object in the image 300. In some embodiments, a positional relationship between the first object and the second object in the image may be defined by a relative position vector between the first object and the second object in the image. For example, the relative position vector may be defined by a second degree tuple (θ, D), wherein θ is the angle between the center points of the two objects and D is the pixel distance between the center points of the two objects.

In some embodiments, the angle θ may be defined as the intersection angle from the horizontal line passing through the first object to the line connecting the first object and the second object in a counterclockwise direction. For example, the angle between the first object and the second object in FIG. 3 may be defined as the angle in a counterclockwise direction from a horizontal line passing through the first center position 312 to a first line 330 that connects the first center position 312 and the second center position 322. The pixel distance D between two center points in FIG. 3 may be the length of the first line 330. Further relative position vectors between the first center position 312, the second center position 322, and the image center position 302 may be calculated using the same process. For example, a second line 332 may represent the distance between the first center position 312 and the image center position 302. A third line 334 may represent the distance between the second center position 322 and the image center position 302.

In these and other embodiments, the positional relationship of objects within an image may be determined based on the relative position vectors. For example, the position relationship between the first object and the second object in the image 300 may be determined as left-right positional relationship based on the first line 330 going cross a left side of the first bounding box 310 and a right side of the second bounding box 320. In some embodiments, there may be different position relationships that may be determined between objects based on the relative position vectors. For example, the position relationships may include top-down position relationship, overlapping position relationship, inclusive position relationship, and separated position relationship, among others. A top-down position relationship may define a relation where a line between two center points goes across a top and a bottom side of two bounding boxes. An overlapping position relationship may define a relation where two bounding boxes are overlapped. An inclusive position relationship may define a relation where a bounding box is fully included by another bounding box. A separated position relationship may define a relation where two bounding boxes are totally separated. In some embodiments, the positional relationship of two objects may include more than one position relationships. For example two objects may include a top-down position relationship and a separated position relationship.

In some embodiments, rules may be applied to the relative position vectors to determine the information from the images. In some embodiments, a matrix may be used to define the positional relationships between objects in an image. For example, the matrix may have dimensions (M+1, M+1) where M is equal to a number of objects in the image for which a positional relationship is determined. The elements of the matrix may include relative position vectors between the objects and between the objects and a center position of the image. For example, for an object A, object B, and center point P, a 3×3 matrix may be generated with relative position vectors as follows:

$$
\begin{bmatrix}
(A, A) & (A, B) & (A, P) \\
(B, A) & (B, B) & (B, P) \\
(P, A) & (P, B) & (P, P)
\end{bmatrix}
$$

where the notation (letter, letter) represents the relative position vectors between the object A, object B, and center point P. For example, the notation (A,A) may be a relative position vector with values (0,0) indicated that this element represents the relationship of A with itself. The notation (A,B) may be a relative position vector with values (θ, D) that represents the relationship between object A and object B from the perspective of object A and notation (B,A) may be a relative position vector with values (θ, D) that represents the relationship between object A and object B from the perspective of object B. Note that the pixel distance D may be the same for (A,B) and (B,A) and the angles would be related. In these and other embodiments, a set of computations may be applied to the matrix to determine an interrelationship among different objects. The set of computations may be defined by the rules.

An example of the operation of the environment 100 is now provided with respect to FIGS. 2A and 2B. A first image that includes the first view 200 may be obtained from an API based on a location of the electric pole 210. For example, the image acquisition system 110 may provide the location of the electric pole 210 to the API and obtain the first image of the first view 200. The machine learning system 120 may classify the electric pole 210 as illustrated in the first image as an electric pole and generate the first bounding box 220 around the electric pole 210. The view analysis system 130 may obtain the classification and data regarding the first bounding box 220. The view analysis system 130 may apply rules to the information to determine if a top of the electric pole with a transformer is illustrated in the first image. In these and other embodiments, the rules may include comparing a relative position of the electric pole 210 in the first image to a condition.

The view analysis system 130 may determine based on the relative position of the electric pole 210 that the transformer is not illustrated. For example, the view analysis system 130 may determine that the transformer is not illustrated based on the top of the bounding box sharing a boundary with the image and/or a central point of the first bounding box 220 not being within a threshold of a central point of the first image. Based on the relational position of the electric pole 210, the view analysis system 130 may determine adjustments to the viewing parameters. The image acquisition system 110 may provide the adjusted viewing parameters to the API to obtain the second image of the second view 202 of the location from the API based on the adjusted viewing parameters. Using the second image, the machine learning system 120 may identify the electric pole 210 and generate the second bounding box 240. The view analysis system 130 may obtain the classification and data regarding the second bounding box 240.

The view analysis system 130 may apply rules to the information to determine that the top of the electric pole 210 with a transformer is illustrated in the second image. The view analysis system 130 may apply a further machine learning algorithm to determine ownership of the electric pole 210 based on a shape and/or information provided on the transformer. In some embodiments, the view analysis system 130 may adjust the field of view and have the image acquisition system 110 obtain an image based on the adjusted field of view with the top of the electric pole 210 enlarged to assist in determining ownership of the electric pole 210.

As another example, the image acquisition system 110 in FIG. 1 may be used to acquire an image of a traffic signpost. The machine learning system 120 may be configured to detect the traffic sign and determine its location within the image. The view analysis system 130 may be configured to adjust the image acquisition system 110 to acquire a new image of the traffic signpost based on relative position of the traffic signpost, focusing on a top part of the traffic signpost to determine traffic signs.

As another example, the image acquisition system 110 in FIG. 1 may be used to acquire an image of a vehicle. The machine learning system 120 may be configured to detect the vehicle and a person in the image. The view analysis system 130 may be configured to determine a positional relationship between the vehicle and the person to determine if the person is in the driver's seat of the vehicle.

As another example, the image acquisition system 110 in FIG. 1 may be used to acquire an image of people. The machine learning system 120 may be configured to detect the people in the image. The view analysis system 130 may be configured to determine a positional relationship between the people to determine if the people are maintaining a particular distance therebetween.

Modifications, additions, or omissions may be made to the environment 100 without departing from the scope of the present disclosure. For example, in some embodiments, the environment 100 may be configured to obtain multiple images over time, where each image represents a view of a scene at a particular time such that the images indicate a change in the scene over time. For example, the images may be obtained such that the images when displayed in sequence may be used as a video illustrating a scene over time. In these and other embodiments, a change in the positional relationship between objects over time may be determined. In these and other embodiments, a matrix may be formed for each image to represent the positional relationships between objects. Computations may be performed on the matrices for each image to determine a change in the positional relationship between the objects over time.

As an example, the image acquisition system 110 in FIG. 1 may be used to acquire multiple images of a person at a curb. The machine learning system 120 may be configured to detect the person and the curb in the images. The view analysis system 130 may be configured to determine a change in the positional relationship between the person and the curb to determine if the person is leaving the curb and entering a street adjacent to the curb.

Figure 4:
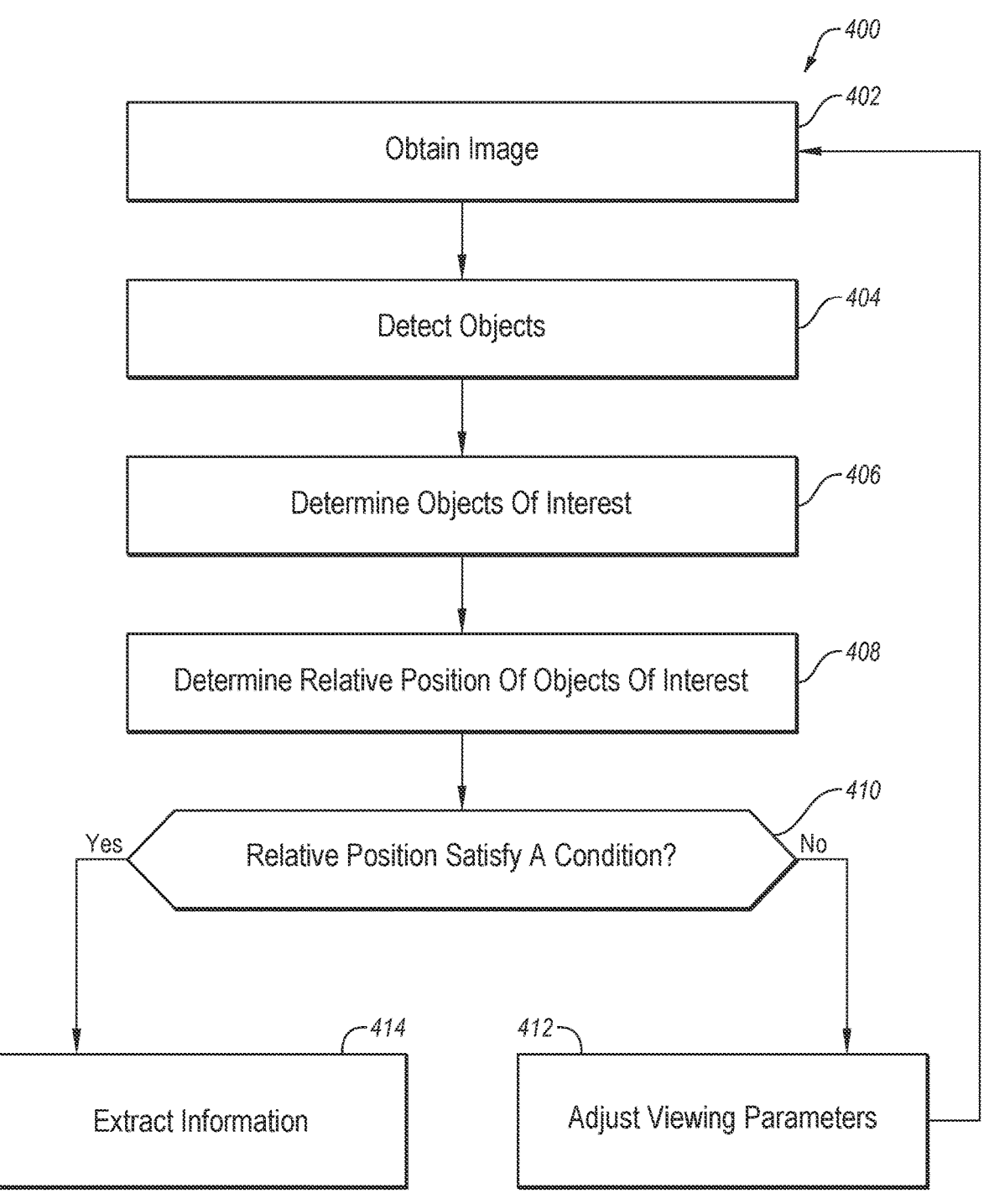
FIG. 4 illustrates a flowchart of an example method of image view adjustment.

FIG. 4 illustrates a flowchart of an example method that may be used when clustering data. The method 400 may be arranged in accordance with at least one embodiment described in the present disclosure. One or more operations of the method 400 may be performed, in some embodiments, by a device or system, such as the system 700 of FIG. 7 or another device, combination of devices, system, or systems, such as those systems described with respect to FIG. 1. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 402, where an image of a view of a scene may be obtained. For example, an image of an object may be obtained through an external sensor, such as a camera. In some embodiments, the image may be defined by one or more viewing parameters. The parameters may include a heading, a field of view, and/or pitch, among others.

At block 404, objects in the image of the view may be detected. For example, one or more machine learning algorithms may be applied to determine detected objects. In these and other embodiments, the objects may be classified and bounding boxes may be determined for each of the objects.

At block 406, specific objects of interest may be determined according to information to be collected. For example, when ten different objects are classified, such as four trees, three birds, and three people and the information is to be collected about the people, then the objects of interest may be the people in the image.

At block 408, relative positions of the objects of interest may be determined. In some embodiments, relative position of the objects in the list may be determined based on relative position vectors between the objects. A relative position vector may be represented by 2-tuple $(\theta, D)$ where $\theta$ represents the angle between two objects, and D represents the distance between the two objects. A relative position vector matrix may be created for the objects of interest. The relative position vector matrix may represent interrelationship of the objects.

At block 410, it may be determined if the relative position of the objects satisfy a condition. For example, a condition may require a certain object to be uncovered and entirely viewable. If the relative position between the certain object and another object reveals that the certain object is overlapped with another object, the preset condition may not be satisfied. If the relative position reveals that the certain object is separated from another object, the preset condition may be satisfied. When the preset condition is satisfied, the method may proceed to block 414. In response to the preset condition not being satisfied, the method 400 may proceed to block 412.

At block 412, the one or more viewing parameters may be adjusted. The adjustment may be determined based on the relative position of the objects. In response to adjusting one or more viewing parameters at block 412, the method 400 may proceed back to block 402 to obtain a second image of a second view of the scene.

At block 414, information about the one or more viewing parameters of defining the image may be configured to be extracted.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 5:
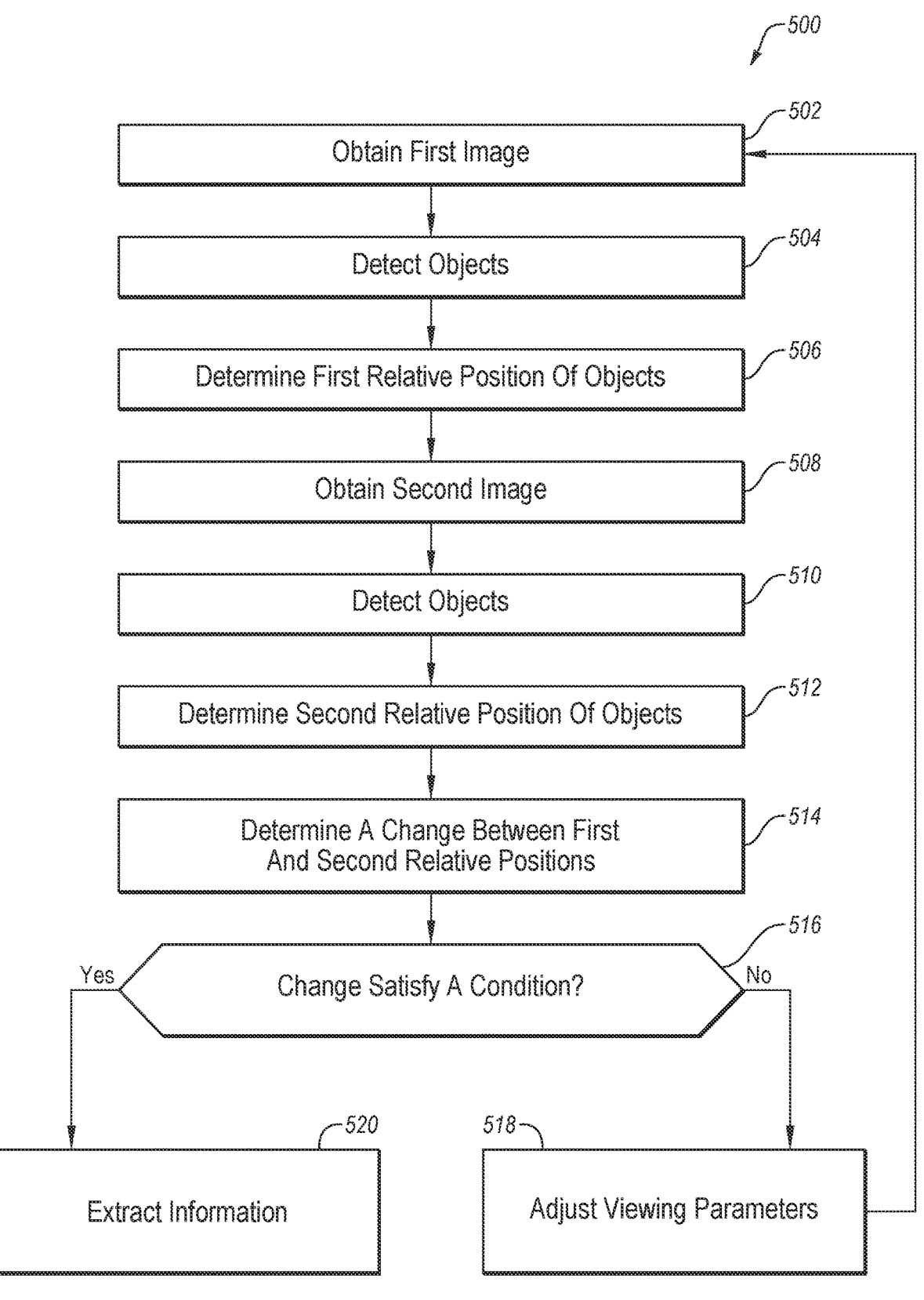
FIG. 5 illustrates a flowchart of another example method of image view adjustment.

FIG. 5 illustrates a flowchart of another example method 500 of image view adjustment. The method 500 may be arranged in accordance with at least one embodiment described in the present disclosure. One or more operations of the method 500 may be performed, in some embodiments, by a device or system, such as the system 700 of FIG. 7 or another device, combination of devices, system, or systems, such as those systems described with respect to FIG. 1. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 502, where a first image of a view at a first instance may be obtained from an input source. For example, the first image may be obtained from a camera.

At block 504, objects in the first image may be detected. For example, a machine learning system such as the machine learning system 120 of FIG. 1 may be used to detect objects in the first image.

At block 506, a first relative position of the detected objects in the first image may be determined. For example, a view analysis system such as the view analysis system 130 of FIG. 1 may be configured to determine the first relative position of the detected objects in the first image.

At block 508, a second image of the view at a second instance may be obtained. In these and other embodiments, the second instance may be later than the first instance. At block 510, objects in the second image may be detected. For example, a machine learning system such as the machine learning system 120 of FIG. 1 may be used to detect objects in the first image. The objects detected in the second image may be the same objects detected in the first image.

At block 512, a second relative position of the detected objects in the second image may be determined. For example, a view analysis system such as the view analysis system 130 of FIG. 1 may be configured to determine the second relative position of the detected objects in the second image.

At block 514, the first relative position and the second relative position may be compared to determine a change between the first relative position and the second relative position. The change in the relative position of the objects may indicate movement of the objects between when the first image and the second image were captured.

At block 516, it may be determined whether the change between the first relative position and the second relative position satisfies a condition. In response to the condition not being satisfied, the method 500 may proceed to block 518 In response to the condition being satisfied at block 516, the method 500 may proceed to block 520.

At block 518, the viewing parameters may be adjusted. The viewing parameters may be adjusted based on the change between the first relative position and the second relative position. Alternately or additionally, the viewing parameters may be adjusted based on the first relative position and/or the second relative position. After the viewing parameters have been adjusted in block 518, the method 500 may proceed to block 502 to obtain another image using the adjusted viewing parameters.

At block 520, information may be extract. The information may be related to the condition. For example, the information may relate to movement of one or more of the objects.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Modifications, additions, or omissions may be made to FIG. 5 without departing from the scope of the present disclosure.

Figure 6:
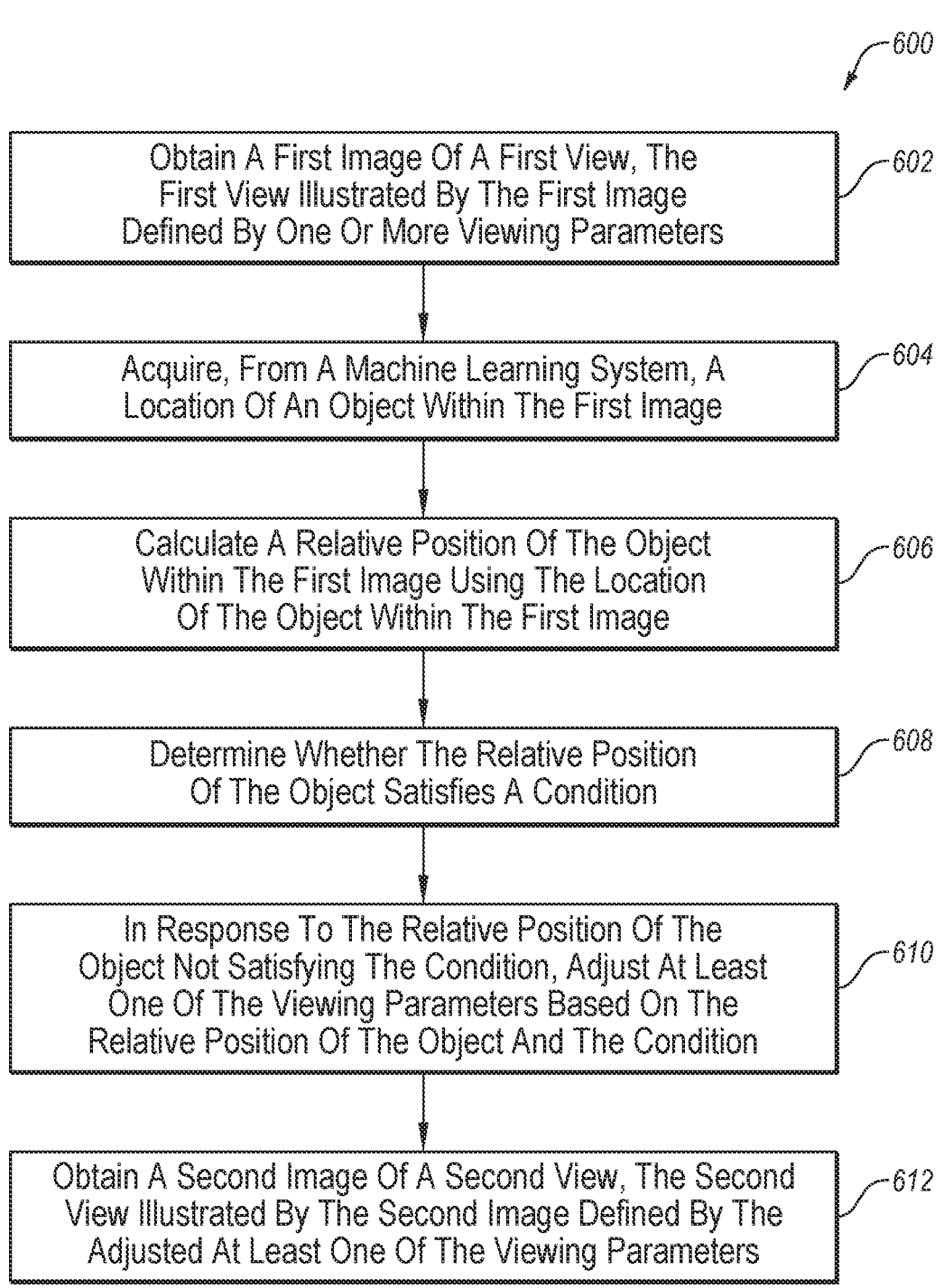
FIG. 6 illustrates a flowchart of another example method of image view adjustment.

FIG. 6 illustrates a flowchart of an example method 600 of image view adjustment. The method 600 may be arranged in accordance with at least one embodiment described in the present disclosure. One or more operations of the method 600 may be performed, in some embodiments, by a device or system, such as the system 700 of FIG. 6 or another device, combination of devices, system, or systems, such as those systems described with respect to FIG. 1. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 602, where a first image of a first view may be obtained. In some embodiments, the first view illustrated by the first image may be defined by one or more viewing parameters.

At block 604, a location of an object within the first image may be acquired from a machine learning system. In some embodiments, the location of the object within the first image may be acquired by obtaining a plurality of objects illustrated in the first image that include the object and selecting the object from the plurality of objects based on the object corresponding to a condition.

At block 606, a relative position of the object within the first image may be calculated using the location of the object within the first image. At block 608, whether the relative position of the object satisfies a condition may be determined.

At block 610, in response to the relative position of the object not satisfying the condition, at least one of the viewing parameters may be adjusted based on the relative position of the object and the condition.

At block 612, a second image of a second view may be obtained. In some embodiments, the second view illustrated by the second image may be defined by the adjusted at least one of the viewing parameters.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Modifications, additions, or omissions may be made to FIG. 6 without departing from the scope of the present disclosure. For example, the method 600 may further include acquiring a second location of a second object within the first image from the machine learning system and calculating a relative position of the object with respect to the second object using the second location of the second object within the first image. In these and other embodiments, determining whether the relative position of the object satisfies the condition may include determining whether the relative position of the object with respect to the second object satisfies the condition.

In some embodiments, the method 600 may further include acquiring a second location of the object within the second image from the machine learning system. In these and other embodiments, a second relative position of the object within the second image may be calculated using the second location of the object within the second image, and whether the second relative position of the object satisfies the condition may be determined. In these and other embodiments, the method 600 may further include, in response to the second relative position of the object not satisfying the condition, adjusting at least one of the viewing parameters based on the second relative position of the object and the condition and obtaining a third image of a third view, where the third view illustrated by the third imaged may be defined by the further adjusted at least one of the viewing parameters.

In some embodiments, the method 600 may further include extracting information from the second image associated with the condition in response to the second relative position of the object satisfying the condition. In these and other embodiments, the information may be obtained from the object as illustrated in the second image.

In some embodiments, the method 600 may further include obtaining a third image of the first view, the third image captured at a second time that is different than a first time at which the first image is captured and the third image obtained before the second image is obtained, acquiring a second location of the object within the third image from the machine learning system, calculating a second relative position of the object within the third image using the second location of the object within the third image, and determining a change in the relative position of the object based on the relative position of the object and the second relative position of the object. In these and other embodiments, determining whether the relative position of the object satisfies the condition may include determining whether the change in the relative position of the object satisfies the condition.

In some embodiments, the method 600 may further include acquiring a third location of a second object within the first image from the machine learning system, acquiring a fourth location of the second object within the second image from the machine learning system, calculating a third relative position of the object with respect to the second object using the third location of the second object within the first image, calculating a fourth relative position of the object with respect to the second object using the fourth location of the second object within the second image, and determining a second change in the relative position of the object with respect to the second object based on the third relative position and the fourth relative position. In these and other embodiments, determining whether the relative position of the object satisfies the condition may include determining whether the second change in the relative position of the object satisfies the condition.

Figure 7:
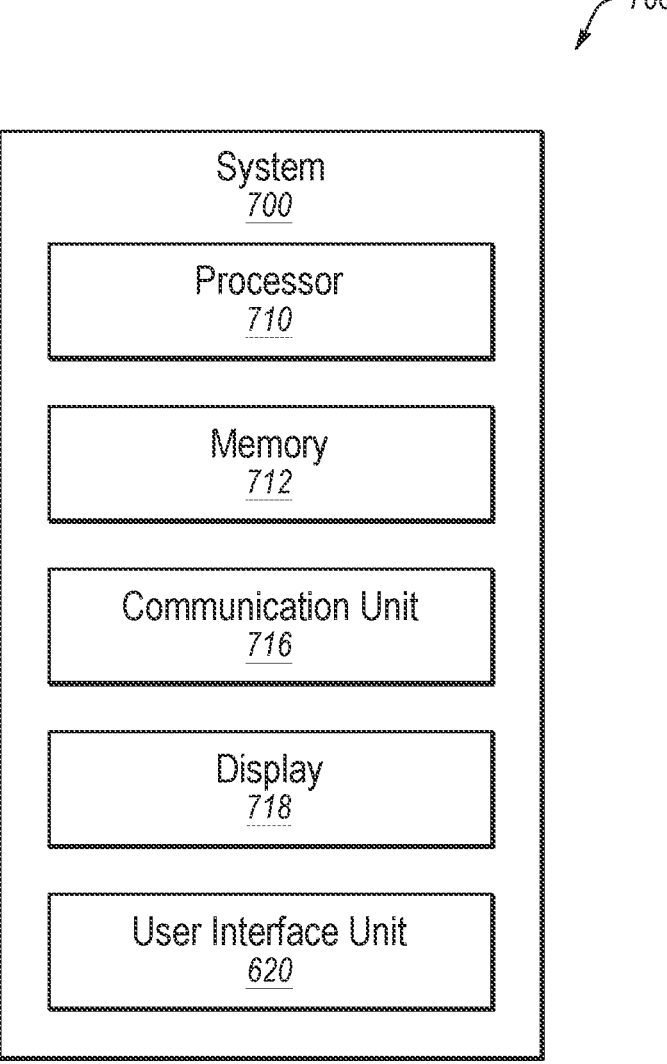
FIG. 7 illustrates an example system that may be used for image view adjustment.

FIG. 7 is a block diagram illustrating an example system 700 that may be used for data clustering, according to at least one embodiment of the present disclosure. The system 700 may include a processor 710, memory 712, a communication unit 716, a display 718, and a user interface unit 720, which all may be communicatively coupled. In some embodiments, the system 700 may be used to perform one or more of the methods described in this disclosure.

For example, the system 700 may be used to perform one or more of the operations in the example environment 100.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of networks or physical locations that are configured to perform individually or collectively any number of operations described herein. In some embodiments, the processor 710 may interpret and/or execute program instructions and/or process data stored in the memory 712. In some embodiments, the processor 710 may execute the program instructions stored in the memory 712.

For example, in some embodiments, the processor 710 may execute program instructions stored in the memory 712 that are related to task execution such that the system 700 may perform or direct the performance of the operations associated therewith as directed by the instructions. In these and other embodiments, the instructions may be used to perform one or more operations of FIG. 1, one or more blocks of method 400 of FIG. 4, or one or more blocks of method 500 of FIG. 5, or one or more blocks of method 600 of FIG. 6.

The memory 712 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 710.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 710 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 716 may include any component, device, system, or combination thereof that is configured to transmit or receive information over a network. In some embodiments, the communication unit 716 may communicate with other devices at other locations, the same location, or even other components within the same system. For example, the communication unit 716 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 716 may permit data to be exchanged with a network and/or any other devices or systems described in the present disclosure.

The display 718 may be configured as one or more displays, like an LCD, LED, Braille terminal, or other type of display. The display 718 may be configured to present video, text captions, user interfaces, and other data as directed by the processor 710.

The user interface unit 720 may include any device to allow a user to interface with the system 700. For example, the user interface unit 720 may include a mouse, a track pad, a keyboard, buttons, camera, and/or a touchscreen, among other devices. The user interface unit 720 may receive input from a user and provide the input to the processor 710. In some embodiments, the user interface unit 720 and the display 718 may be combined.

Modifications, additions, or omissions may be made to the system 700 without departing from the scope of the present disclosure. For example, in some embodiments, the system 700 may include any number of other components that may not be explicitly illustrated or described. Further, depending on certain implementations, the system 700 may not include one or more of the components illustrated and described.

As indicated above, the embodiments described herein may include the use of a special purpose or general-purpose computer (e.g., the processor 710 of FIG. 7) including various computer hardware or software modules, as discussed in greater detail below. Further, as indicated above, embodiments described herein may be implemented using computer-readable media (e.g., the memory 712 of FIG. 7) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides. Additionally, use of the term "based on" should not be interpreted as "only based on" or "based only on." Rather, a first element being "based on" a second element includes instances in which the first element is based on the second element but may also be based on one or more additional elements.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:

obtaining a first image of a first view, the first view illustrated by the first image defined by one or more viewing parameters and the first image being a photographic image;

obtaining a third image of the first view, the third image captured at a second time that is different than a first time at which the first image is captured;

acquiring, from a machine learning system, a location of an object within the first image;

acquiring, from the machine learning system, a second location of the object within the third image;

calculating a relative position of the object within the first image using the location of the object within the first image;

calculating a second relative position of the object within the third image using the second location of the object within the third image;

determining a change in the relative position of the object based on the relative position of the object and the second relative position of the object;

determining whether the change in the relative position of the object satisfies a condition;

in response to the change in the relative position of the object not satisfying the condition, adjusting at least one of the viewing parameters based on the change in the relative position of the object and the condition; and obtaining a second image of a second view, the second view illustrated by the second image defined by the adjusted at least one of the viewing parameters and the second image being a photographic image, the third image obtained before the second image is obtained.

2. The method of claim 1, further comprising:

acquiring, from the machine learning system, a second location of a second object within the first image; and calculating a relative position of the object with respect to the second object using the second location of the second object within the first image, wherein determining whether the relative position of the object satisfies the condition includes determining whether the relative position of the object with respect to the second object satisfies the condition.

3. The method of claim 1, wherein acquiring, from the machine learning system, the location of the object within the first image comprises:

obtaining a plurality of objects illustrated in the first image that include the object; and selecting the object from the plurality of objects based on the object corresponding to the condition.

4. The method of claim 1, further comprising:

acquiring, from the machine learning system, a second location of the object within the second image;

calculating a second relative position of the object within the second image using the second location of the object within the second image; and determining whether the second relative position of the object satisfies the condition.

5. The method of claim 4, further comprising:

in response to the second relative position of the object not satisfying the condition, further adjusting at least one of the viewing parameters based on the second relative position of the object and the condition; and obtaining a third image of a third view, the third view illustrated by the third image defined by the further adjusted at least one of the viewing parameters.

6. The method of claim 4, further comprising in response to the second relative position of the object satisfying the condition, extracting information from the second image associated with the condition.

7. The method of claim 6, wherein the information is obtained from the object as illustrated in the second image.

8. The method of claim 1, further comprising:

acquiring, from the machine learning system, a third location of a second object within the first image;

acquiring, from the machine learning system, a fourth location of the second object within the second image;

calculating a third relative position of the object with respect to the second object using the third location of the second object within the first image;

calculating a fourth relative position of the object with respect to the second object using the fourth location of the second object within the second image; and determining a second change in the relative position of the object with respect to the second object based on the third relative position and the fourth relative position, wherein determining whether the relative position of the object satisfies the condition includes determining whether the second change in the relative position of the object satisfies the condition.

9. One or more non-transitory computer-readable storage media configured to store instructions that, in response to being executed, cause a system to perform the method of claim 1.

10. A system comprising:

one or more computer-readable storage media configured to store instructions; and one or more processors communicatively coupled to the one or more computer-readable storage media and configured to, in response to execution of the instructions, cause the system to perform operations, the operations comprising:

obtaining a first image of a first view, the first view illustrated by the first image defined by one or more viewing parameters and the first image being a photographic image;

obtaining a third image of the first view, the third image captured at a second time that is different than a first time at which the first image is captured;

acquiring, from a machine learning system, a location of an object within the first image;

acquiring, from the machine learning system, a second location of the object within the third image;

calculating a relative position of the object within the first image using the location of the object within the first image;

calculating a second relative position of the object within the third image using the second location of the object within the third image;

determining a change in the relative position of the object based on the relative position of the object and the second relative position of the object;

determining whether the change in the relative position of the object satisfies a condition;

in response to the change in the relative position of the object not satisfying the condition, adjusting at least one of the viewing parameters based on the change in the relative position of the object and the condition; and obtaining a second image of a second view, the second view illustrated by the second image defined by the adjusted at least one of the viewing parameters and the second image being a photographic image, the third image obtained before the second image is obtained.

11. The system of claim 10, wherein the operations further comprise:

acquiring, from the machine learning system, a second location of a second object within the first image; and calculating a relative position of the object with respect to the second object using the second location of the second object within the first image, wherein determining whether the relative position of the object satisfies the condition includes determining whether the relative position of the object with respect to the second object satisfies the condition.

12. The system of claim 10, wherein acquiring, from the machine learning system, the location of the object within the first image comprises:

obtaining a plurality of objects illustrated in the first image that include the object; and selecting the object from the plurality of objects based on the object corresponding to the condition.

13. The system of claim 10, wherein the operations further comprise:

acquiring, from the machine learning system, a second location of the object within the second image;

calculating a second relative position of the object within the second image using the second location of the object within the second image; and determining whether the second relative position of the object satisfies the condition.

14. The system of claim 13, wherein the operations further comprise:

in response to the second relative position of the object not satisfying the condition, further adjusting at least one of the viewing parameters based on the second relative position of the object and the condition; and obtaining a third image of a third view, the third view illustrated by the third image defined by the further adjusted at least one of the viewing parameters.

15. The system of claim 13, wherein the operations further comprise in response to the second relative position of the object satisfying the condition, extracting information from the second image associated with the condition.

16. The system of claim 15, wherein the information is obtained from the object as illustrated in the second image.

17. The system of claim 10, wherein the operations further comprise:

acquiring, from the machine learning system, a third location of a second object within the first image;

acquiring, from the machine learning system, a fourth location of the second object within the second image;

calculating a third relative position of the object with respect to the second object using the third location of the second object within the first image;

calculating a fourth relative position of the object with respect to the second object using the fourth location of the second object within the second image; and determining a second change in the relative position of the object with respect to the second object based on the third relative position and the fourth relative position, wherein determining whether the relative position of the object satisfies the condition includes determining whether the second change in the relative position of the object satisfies the condition.

18. The system of claim 10, wherein the viewing parameters include one or more: heading, pitch, and field of view.

* * * * *